US012282987B2

(12) United States Patent
Liu et al.

(10) Patent No.: US 12,282,987 B2
(45) Date of Patent: Apr. 22, 2025

(54) GENERATING IMAGE MATTES WITHOUT TRIMAP SEGMENTATIONS VIA A MULTI-BRANCH NEURAL NETWORK

(71) Applicant: Adobe Inc., San Jose, CA (US)

(72) Inventors: Zichuan Liu, San Jose, CA (US); Xin Lu, Mountain View, CA (US); Ke Wang, Berkeley, CA (US)

(73) Assignee: Adobe Inc., San Jose, CA (US)

( * ) Notice: Subject to any disclaimer, the term of this patent is extended or adjusted under 35 U.S.C. 154(b) by 37 days.

(21) Appl. No.: 18/053,646

(22) Filed: Nov. 8, 2022

(65) Prior Publication Data
US 2024/0161364 A1  May 16, 2024

(51) Int. Cl.
*G06T 11/60* (2006.01)
*G06N 3/02* (2006.01)
*G06N 3/08* (2023.01)
*G06N 20/00* (2019.01)
*G06T 7/13* (2017.01)
*G06V 10/44* (2022.01)

(52) U.S. Cl.
CPC ............... *G06T 11/60* (2013.01); *G06T 7/13* (2017.01); *G06V 10/44* (2022.01); *G06N 3/02* (2013.01); *G06N 3/08* (2013.01); *G06N 20/00* (2019.01); *G06T 2207/20084* (2013.01)

(58) Field of Classification Search
CPC . G06T 11/60; G06T 7/13; G06T 2207/20084; G06V 10/44; G06N 3/08; G06N 20/00; G06N 3/02
See application file for complete search history.

(56) References Cited

U.S. PATENT DOCUMENTS

| 10,984,272 | B1* | 4/2021 | Shrivastava | G06T 5/70 |
| 11,189,031 | B2* | 11/2021 | Bradski | G06T 5/20 |
| 2020/0026999 | A1* | 1/2020 | Wang | G06N 3/063 |
| 2020/0302297 | A1* | 9/2020 | Jaganathan | G06V 10/454 |
| 2021/0272654 | A1* | 9/2021 | Thaker | G01N 15/1433 |
| 2022/0036548 | A1* | 2/2022 | Hu | A61B 5/4325 |

(Continued)

OTHER PUBLICATIONS

Ke et al—MODNet Real-Time Trimap-Free Portrait Matting via Objective Decomposition—202207—AAAI (Year: 2022).*

(Continued)

*Primary Examiner* — YuJang Tswei
(74) *Attorney, Agent, or Firm* — Keller Preece PLLC

(57) ABSTRACT

Methods, systems, and non-transitory computer readable storage media are disclosed for generating image mattes for detected objects in digital images without trimap segmentation via a multi-branch neural network. The disclosed system utilizes a first neural network branch of a generative neural network to extract a coarse semantic mask from a digital image. The disclosed system utilizes a second neural network branch of the generative neural network to extract a detail mask based on the coarse semantic mask. Additionally, the disclosed system utilizes a third neural network branch of the generative neural network to fuse the coarse semantic mask and the detail mask to generate an image matte. In one or more embodiments, the disclosed system also utilizes a refinement neural network to generate a final image matte by refining selected portions of the image matte generated by the generative neural network.

20 Claims, 11 Drawing Sheets

(56) References Cited

U.S. PATENT DOCUMENTS

2023/0409896 A1* 12/2023 Zhu .......................... G06T 7/11

OTHER PUBLICATIONS

Yaman_Alpha_Matte_Generation_From_Single_Input_for_Portrait_ (Year: 2022).*

Jang_Interactive_Image_Segmentation_via_Backpropagating_Refinement_Scheme_CVPR_2019_paper (Year: 2019).*

Zhang_Deep_Image_Compositing_WACV_2021_paper (Year: 2021).*

N. Xu, B. Price, S. Cohen, and T. Huang, "Deep image matting," in Proceedings of the IEEE conference on computer vision and pattern recognition, 2017, pp. 2970-2979.

Q. Yu, J. Zhang, H. Zhang, Y. Wang, Z. Lin, N. Xu, Y. Bai, and A. Yuille, "Mask guided matting via progressive refinement network," in Proceedings of the IEEE/CVF Conference on Computer Vision and Pattern Recognition, 2021, pp. 1154-1163.

N. Xu, "Image and video object selection," Ph.D. dissertation, University of Illinois at Urbana-Champaign, 2017.

* cited by examiner

GENERATING IMAGE MATTES WITHOUT TRIMAP SEGMENTATIONS VIA A MULTI-BRANCH NEURAL NETWORK

BACKGROUND

Improvements to computer processing technologies have led to significant advancements in the field of image processing. Many industries utilize image processing techniques to identify and isolate objects in digital images for manipulating the digital images in a variety of computing environments. To illustrate, many entities use image processing to generate image mattes (e.g., alpha mattes) based on content of digital images/video for use in modifying the digital images/video for photo editing, entertainment (e.g., movies, shows), advertising media, or augmented/virtual reality environments. Detecting objects and object boundaries in digital images, however, can often be a difficult task due to soft boundaries between foreground objects and backgrounds. Furthermore, many users are increasingly using mobile devices (e.g., smartphones) with limited processing resources to perform digital image processing, providing increased utility of accurate, lightweight image processing models.

SUMMARY

This disclosure describes one or more embodiments of methods, non-transitory computer readable media, and systems that solve the foregoing problems (in addition to providing other benefits) by generating image mattes for detected objects in digital images without trimap segmentation via a multi-branch neural network. Specifically, the disclosed systems utilize a first neural network branch of a generative neural network to extract a coarse semantic mask from a digital image. The disclosed systems utilize a second neural network branch of the generative neural network to extract a detail mask based on the coarse semantic mask. Additionally, the disclosed systems utilize a third neural network branch of the generative neural network to fuse the coarse semantic mask and the detail mask to generate an image matte. In one or more embodiments, the disclosed systems also utilize a refinement neural network to generate a final image matte by refining selected portions of the image matte generated by the generative neural network. The disclosed systems thus provide accurate and efficient image matte generation without requiring trimap segmentations for modifying digital images.

BRIEF DESCRIPTION OF THE DRAWINGS

Various embodiments will be described and explained with additional specificity and detail through the use of the accompanying drawings in which.

DETAILED DESCRIPTION

Figure 1:
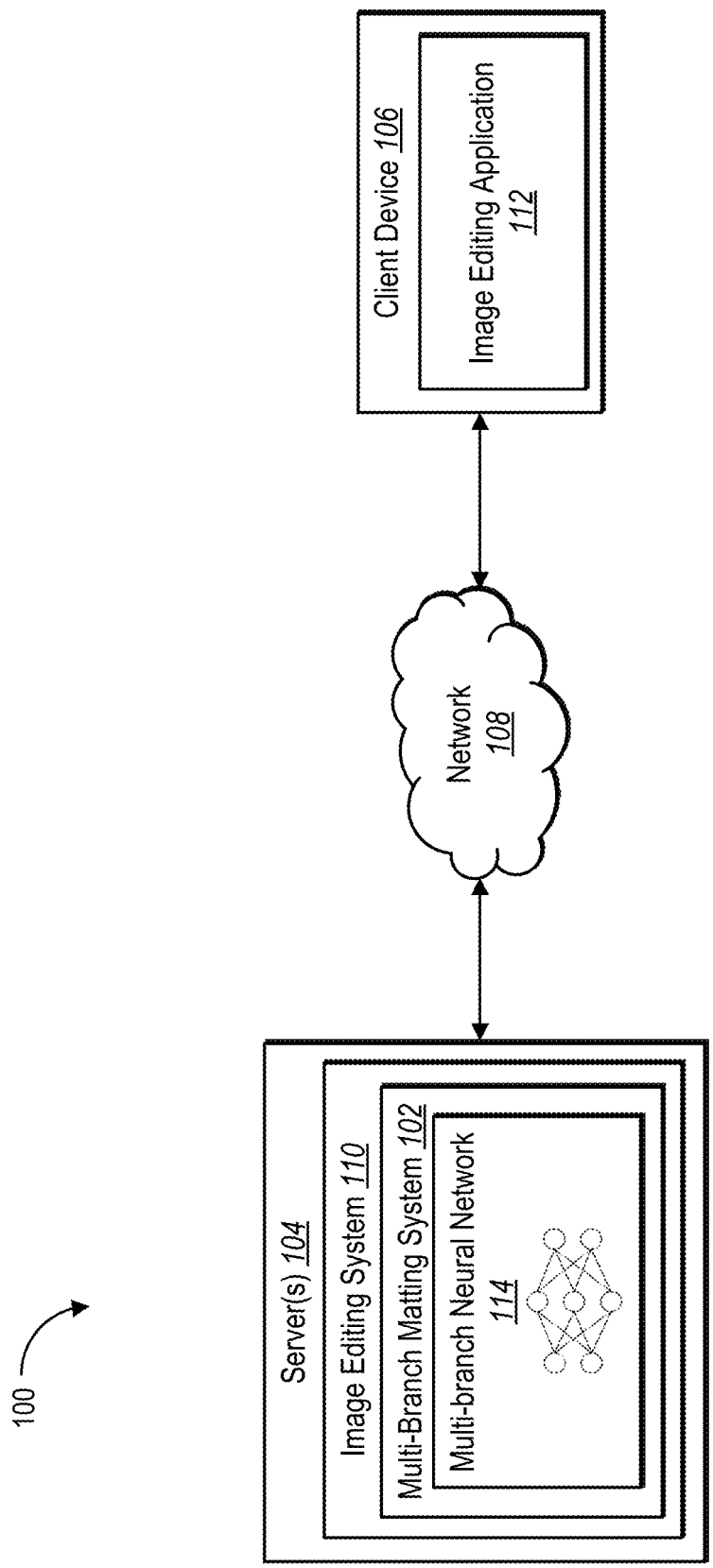
FIG. 1 illustrates an example system environment in which a multi-branch matting system operates in accordance with one or more implementations.

This disclosure describes one or more embodiments of a multi-branch matting system that utilize a multi-branch neural network to generate an image matte for a digital image without a trimap segmentation. Specifically, the multi-branch matting system utilizes a multi-branch neural network to generate an image matte from a digital image. For example, the multi-branch neural network includes a first neural network branch to extract a coarse semantic mask of the digital image. The multi-branch neural network also includes a second neural network branch to extract a detail mask based on the coarse semantic mask. Additionally, the multi-branch neural network includes a third neural network branch to generate the image matte by fusing features from the coarse semantic mask and the detail mask. In one or more embodiments, the multi-branch matting system also utilizes a refinement neural network to refine selected portions of the image matte and generate a final image matte.

As mentioned, in one or more embodiments, the multi-branch matting system utilizes a multi-branch neural network to generate an image matte. In particular, the multi-branch matting system utilizes a first neural network branch (e.g., a semantic branch) of a generative neural network to extract a coarse semantic mask from a digital image. For example, the multi-branch matting system generates a downsampled image from the digital image at a resolution lower than a resolution of the digital image. The multi-branch matting system utilizes the first neural network branch to extract the coarse semantic mask and intermediate image features from the downsampled image. To illustrate, the coarse semantic mask includes a low-resolution estimate of a foreground region and a background region based on the digital image.

In one or more embodiments, the multi-branch matting system also utilizes a second neural network branch (e.g., a detail branch) of the generative neural network to extract a detail mask for the digital image. Specifically, the multi-branch matting system utilizes the second neural network branch to generate the detail mask based on the coarse semantic mask, the intermediate image details, and initial image details extracted from the downsampled image. For example, the detail mask includes local details from the digital image according to semantic information from the coarse semantic mask.

According to one or more embodiments, the multi-branch matting system utilizes a third neural network branch to generate an image matte for the digital image. In particular, the multi-branch matting system utilizes the third neural network branch to generate the image matte (e.g., an intermediate image matte) by combining semantic features of the coarse semantic mask and detail features of the detail mask. Thus, the multi-branch matting system generates an image matte that includes semantic information from the semantic branch and detail information from the detail branch.

Furthermore, in one or more embodiments, the multi-branch matting system generates a final image matte utilizing a refinement neural network. For instance, the multi-branch matting system determines one or more portions of the image matte based on an error map corresponding to the image matte. Additionally, the multi-branch matting system utilizes the refinement neural network to refine the one or more portions of the image matte. The multi-branch matting system generates the final image matte combining the refined portion(s) of the image matte with one or more unrefined portions of the image matte.

Conventional systems for generating image mattes of digital images have a number of shortcomings in relation to accuracy and efficiency of operation. In particular, due to the difficulty of detecting objects with fuzzy/blurry boundaries in digital images, many conventional systems that generate image mattes lack accuracy. For instance, some conventional systems that utilize machine-learning techniques to automatically detect foreground and background objects fail to accurately distinguish the foreground and background in blended regions that include both foreground and background objects.

To overcome such deficiencies, many conventional systems utilize trimap segmentations to distinguish foreground objects from background object in complex regions of digital images. For example, trimap segmentations provide an initial estimation of foreground regions, background regions, and unknown/transition regions between the foreground/background regions to guide foreground/background region detection. While such conventional systems can provide guided processing for more accurate detection of foreground objects, these conventional systems rely on dense neural networks with additional inputs (e.g., user-provided trimap segmentations). Thus, the processing pipeline of the conventional systems is lengthy and is not fully parallelizable in certain computing configurations (e.g., on graphics processing units). Furthermore, requiring trimap segmentations to generate image mattes of digital images requires additional processing and/or user intervention in the process.

The disclosed multi-branch matting system provides a number of advantages over conventional systems. For example, the multi-branch matting system improves the accuracy of computing systems that process digital images. In contrast to conventional systems that inaccurately detect foreground regions and background regions in digital images with fuzzy/blurry boundaries, the multi-branch matting system accurately generates image mattes for digital images via a multi-branch neural network. In particular, the multi-branch matting system utilizes the multi-branch neural network to extract and combine semantic information and detail information from a digital image. The multi-branch matting system generates an intermediate image matte by fusing the semantic information and the detail information via the multi-branch neural network and generates a final image matte by refining portions of the intermediate image matte via a refinement neural network.

Furthermore, the disclosed multi-branch matting system provides improved efficiency of computing systems that process digital images. Specifically, while some conventional systems provide image matting by using trimap segmentations, the multi-branch matting system generates image mattes for digital images without trimap segmentations. For instance, by utilizing a multi-branch neural network to extract coarse semantic information and detail information from a digital image for generating an image matte, the multi-branch matting system provides fast and accurate image matting without requiring a separate trimap segmentation input. To illustrate, the multi-branch matting system utilizes a lightweight generative neural network that runs efficiently and quickly on mobile devices to automatically extract the semantic and detail information.

Furthermore, the multi-branch matting system improves efficiency by generating image mattes without requiring trimap segmentations. In particular, in contrast to conventional systems that require trimap segmentations to generate image mattes, the multi-branch matting system generates image mattes via the multi-branch neural network and without trimap segmentations. For example, the multi-branch matting system eliminates the need for user-intervention and/or additional neural network layers to create a trimap segmentation.

Figure 2:
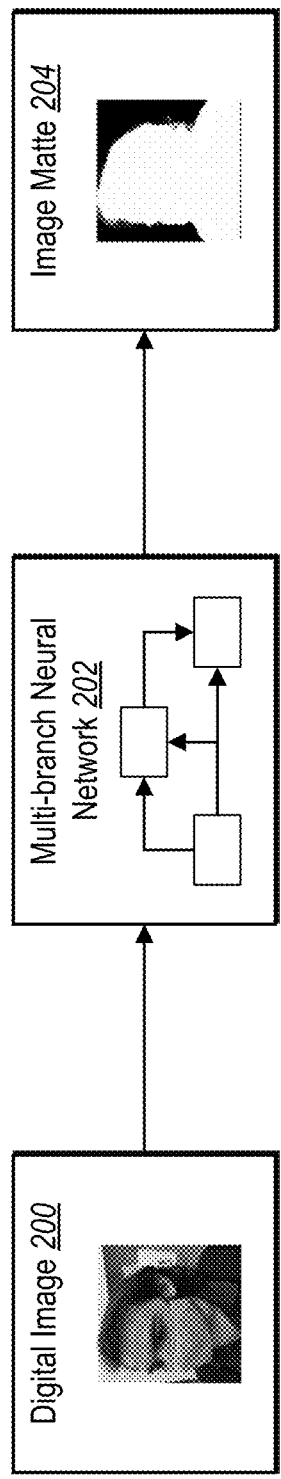
FIG. 2 illustrates a diagram of an overview of the multi-branch matting system generating an image matte utilizing a multi-branch neural network in accordance with one or more implementations.

Turning now to the figures, FIG. 1 includes an embodiment of a system environment 100 in which a multi-branch matting system 102 is implemented. In particular, the system environment 100 includes server device(s) 104 and a client device 106 in communication via a network 108. Moreover, as shown, the server device(s) 104 include an image editing system 110, which includes the multi-branch matting system 102. Additionally, the client device 106 includes an image editing application 112, which optionally includes the image editing system 110 and the multi-branch matting system 102. Furthermore, as illustrated in FIG. 2, the multi-branch matting system 102 includes a multi-branch neural network 114.

As shown in FIG. 1, the server device(s) 104 includes or hosts the image editing system 110. The image editing system 110 includes, or is part of, one or more systems that implement digital image editing operations. For example, the image editing system 110 provides tools for performing various operations on digital images. To illustrate, the image editing system 110 communicates with the client device 106 via the network 108 to provide the tools for display and interaction via the image editing application 112 at the client device 106. Additionally, in some embodiments, the image editing system 110 receives data from the client device 106 in connection with editing digital images, including requests to access digital images stored at the server device(s) 104 (or at another device such as a digital content database) and/or requests to store digital images from the client device 106 at the server device(s) 104 (or at another device). In some embodiments, the image editing system 110 receives interaction data for viewing, generating, or editing a digital image from the client device 106, processes the interaction data (e.g., to view, generate, or edit a digital image), and provides the results of the interaction data to the client device 106 for display via the image editing application 112 or to a third-party system.

According to one or more embodiments, the image editing system 110 utilizes the multi-branch matting system 102 to generate image mattes for digital images. In particular, in connection with editing digital images, the image editing system 110 utilizes the multi-branch matting system 102 to generate image mattes. More specifically, the multi-branch matting system 102 utilizes the multi-branch neural network 114 to extract and combine semantic information and detail information to generate an image matte for a digital image. Thus, the image editing system 110 utilizes the multi-branch matting system 102 to generate an image matte for performing one or more image editing operations in connection with a digital image. In some embodiments, the image editing system 110 provides the image matte and/or the results of an image editing operation involving the image matte to the client device 106 (e.g., for display within the image editing application 112).

In one or more embodiments, the server device(s) 104 include a variety of computing devices, including those described below with reference to FIG. 10. For example, the server device(s) 104 includes one or more servers for storing and processing data associated with editing digital images and generating image mattes. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 10. Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, and interacting with a variety of digital images. In some embodiments, the client device 106 also performs functions for generating, capturing, or accessing data to provide to the image editing system 110 and the multi-branch matting system 102 in connection with editing digital content. For example, the client device 106 communicates with the server device(s) 104 via the network 108 to provide information (e.g., user interactions) associated with digital content. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 10.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 communicate directly). Furthermore, although FIG. 1 illustrates the multi-branch matting system 102 being implemented by a particular component and/or device within the system environment 100, the multi-branch matting system 102 is implemented, in whole or in part, by other computing devices and/or components in the system environment 100 (e.g., the client device 106).

In particular, in some implementations, the multi-branch matting system 102 on the server device(s) 104 supports the multi-branch matting system 102 on the client device 106. For instance, the server device(s) 104 generates or obtains the multi-branch matting system 102 (including the multi-branch neural network 114) for the client device 106. The server device(s) 104 trains and provides the multi-branch matting system 102 to the client device 106 for performing an image matting generation process at the client device 106. In other words, the client device 106 obtains (e.g., downloads) the multi-branch matting system 102 from the server device(s) 104. At this point, the client device 106 is able to utilize the multi-branch matting system 102 to generate image mattes for editing digital images independently from the server device(s) 104.

In alternative embodiments, the multi-branch matting system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital image editing operations and/or image matting operations, and, in response, the multi-branch matting system 102 or the image editing system 110 on the server device(s) 104 performs operations to generate image mattes from digital images and/or to perform additional digital image editing operations. The server device(s) 104 provide the output or results of the operations to the client device 106.

As mentioned, the multi-branch matting system 102 generates image mattes via a multi-branch neural network and without a trimap segmentation. FIG. 2 illustrates an overview of the multi-branch matting system 102 generating an image matte for a digital image via a multi-branch neural network. Specifically, the multi-branch matting system 102 utilizes a generative neural network including a plurality of separate neural network branches (e.g., in a multi-branch neural network) to generate an image matte that combines semantic information and detail information from a digital image.

As illustrated in FIG. 2, the multi-branch matting system 102 determines a digital image 200 including one or more objects. In particular, in one or more embodiments, the digital image 200 includes a foreground region of one or more objects nearest an observer (e.g., a camera view of a photograph or other image) and a background region of one or more objects or regions behind the one or more objects in the foreground region. For example, the digital image includes a foreground object (e.g., a person, an animal) against a background that includes one or more objects (e.g., landscape, buildings) behind the foreground object. Additionally, in one or more embodiments, the foreground region and the background region include one or more edges or boundaries between the foreground object(s) and the background object(s).

Figure 3A:
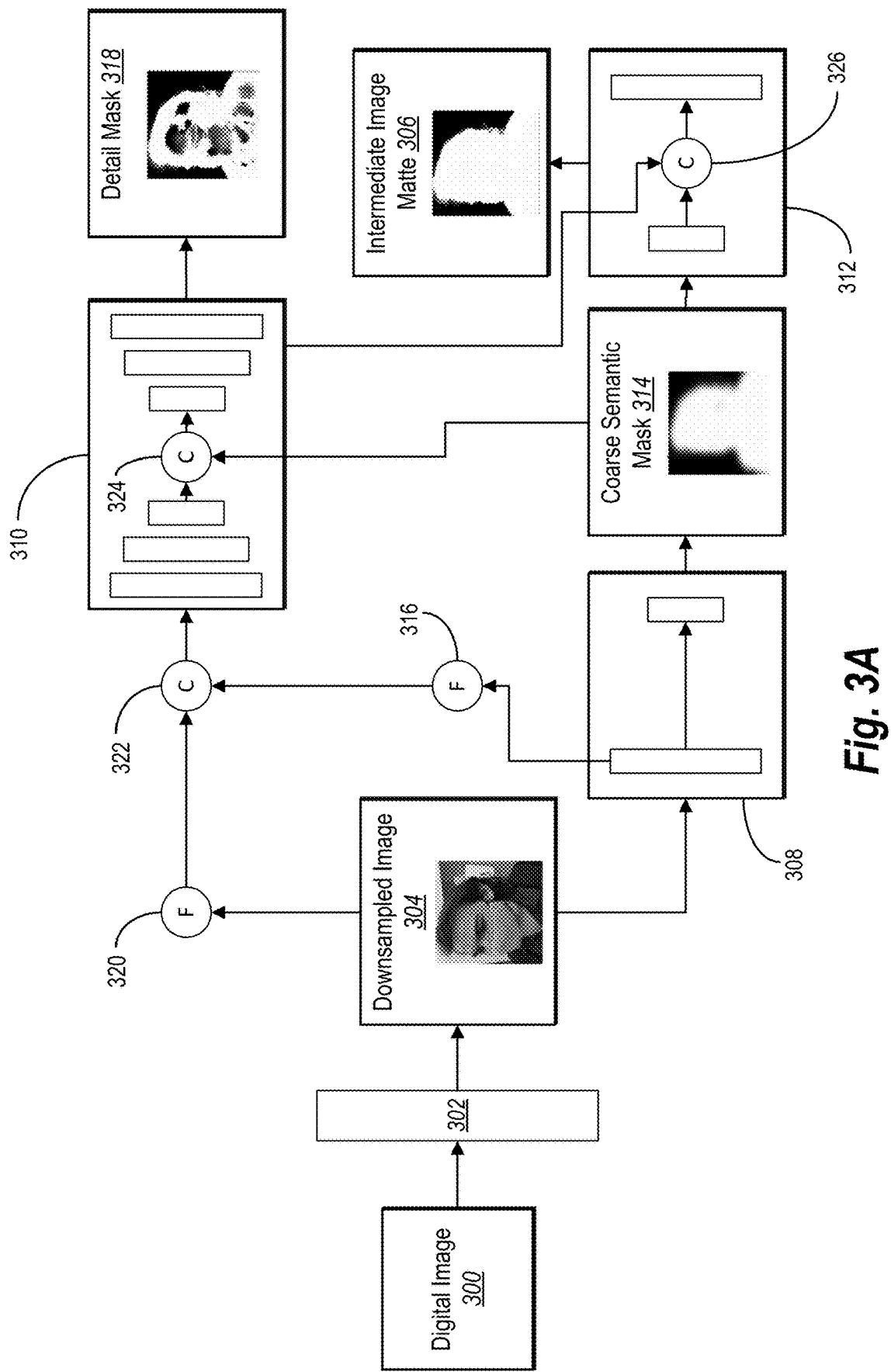
FIGS. 3A-3B illustrate diagrams of the multi-branch matting system generating an image matte via a multi-branch neural network and a refinement neural network in accordance with one or more implementations.

As illustrated in FIG. 2, the multi-branch matting system 102 utilizes a multi-branch neural network 202 to extract an image matte 204 from the digital image. In one or more embodiments, the multi-branch neural network 202 processes the digital image 200 via separate neural network branches to extract semantic information and detail information from the digital image 200. Additionally, the multi-branch neural network 202 includes a neural network branch to combine the semantic information and detail information to generate the image matte 204. FIG. 3A and the corresponding description provide additional detail with respect to generating an image matte from semantic and detail information of a digital image.

In one or more embodiments, the image matte 204 includes an image layer or mask corresponding to the digital image 200 to provide transparency values associated with one or more layers of the digital image 200. For example, the image matte 204 includes alpha transparency values for pixels in the digital image 200 according to one or more objects detected in the digital image 200. In some embodiments, the image matte 204 indicates no transparency for portions of the digital image 200 fully in a foreground region and full transparency for portions of the digital image 200 fully in a background region. Furthermore, in some embodiments, the image matte 204 indicates partial transparency for portions of the digital image 200 with both foreground and background elements (e.g., in portions of the digital image 200 with fuzzy boundaries such as hair or fur).

Additionally, in one or more embodiments, the multi-branch neural network 202 includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a convolutional neural network, a recurrent neural network, or a generative adversarial neural network. In one or more embodiments, a neural network includes, but is not limited to, a plurality of separate neural network branches such as a semantic neural network branch to perform coarse object recognition and image cropping/resizing, a detail neural network branch to detect details at boundaries of detected objects (or edges within objects), and a fusion neural network branch to combine semantic/detail information. Furthermore, in some embodiments, a neural network includes a refinement neural network to refine features of an image matte.

Figure 3B:
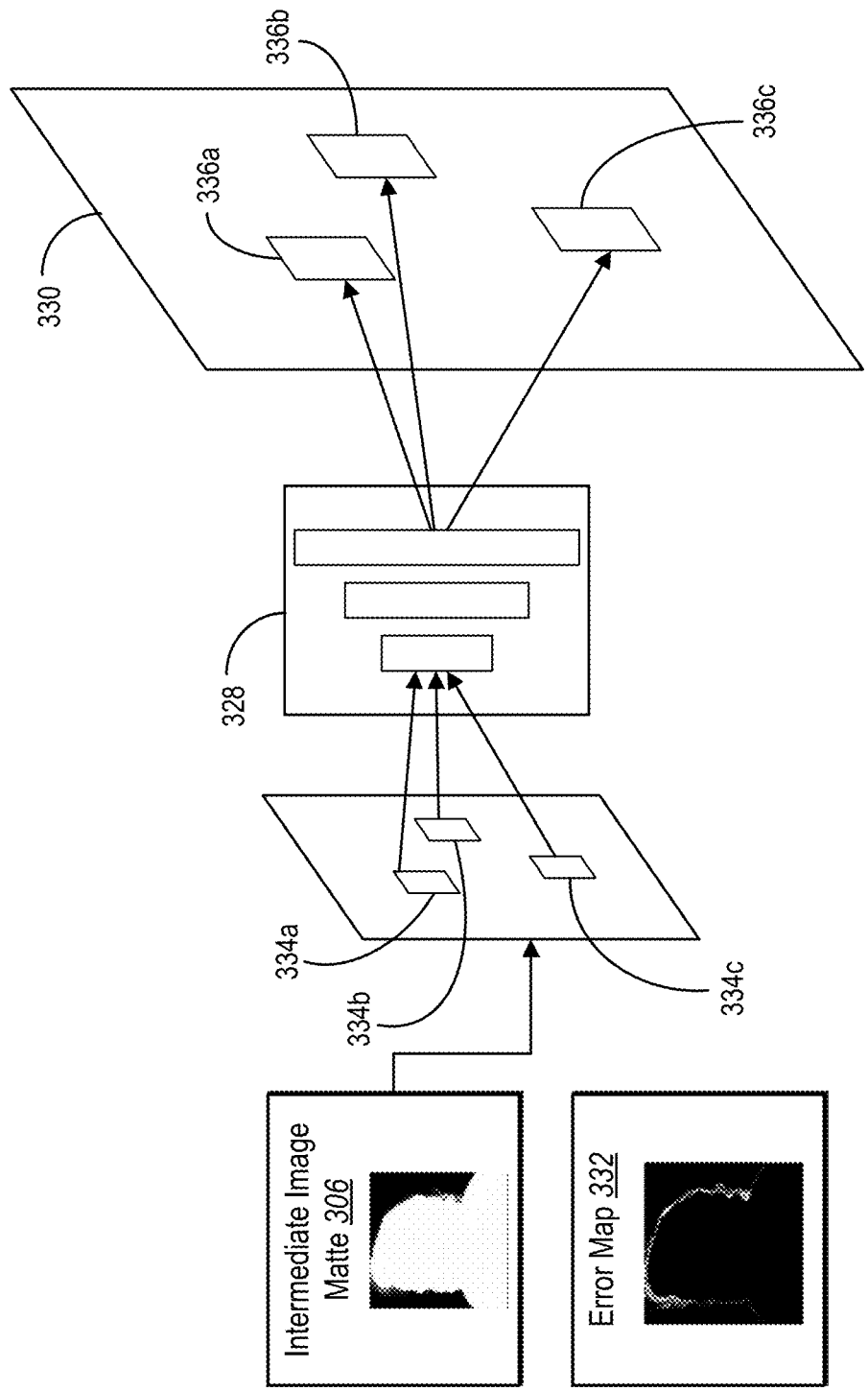

FIGS. 3A-3B illustrate the multi-branch matting system 102 utilizing a generative neural network including a plurality of separate neural network components to generate an image matte for a digital image. Specifically, FIG. 3A illustrates the multi-branch matting system 102 utilizing a multi-branch neural network (e.g., a base matting neural network including a plurality of separate neural network branches) to generate an intermediate image matte. Additionally, FIG. 3B illustrates the multi-branch matting system 102 utilizing a refinement neural network to generate a final image matte from the intermediate image matte.

As mentioned, FIG. 3A illustrates the multi-branch matting system 102 utilizing a multi-branch neural network to generate an image matte from a digital image. In particular, the multi-branch matting system 102 determines a digital image 300 for generating an image matte. To illustrate, the multi-branch matting system 102 determines the digital image 300 in response to a request to generate the image matte or to perform one or more image processing operations that utilize an image matte. For instance, image processing operations that utilize image mattes include operations to modify one or more specific portions of the digital image 300 based on foreground/background objects in the digital image 300.

FIG. 3A illustrates that the multi-branch matting system 102 utilizes a downsampling neural network 302 to generate a downsampled image 304 of the digital image 300. For example, the multi-branch matting system 102 utilizes the downsampling neural network 302 to downsample the digital image 300 to a predetermined resolution (e.g., to 512× 512 pixels) or by a downsampling resolution factor (e.g., a factor of four) such that the resolution of the downsampled image 304 is lower than an original resolution (e.g., 2048× 2048) of the digital image 300. To illustrate, the downsampling neural network 302 includes a convolutional neural network that reduces the resolution and resizes the digital image 300 to generate the downsampled image 304. In some embodiments, the multi-branch matting system 102 maintains a resolution ratio of the digital image 300 for the downsampled image 304. In alternative embodiments, the multi-branch matting system 102 modifies the resolution ratio when generating the downsampled image 304 (e.g., by modifying a rectangular digital image to generate a square downsampled image).

In one or more embodiments, in response to generating the downsampled image 304, the multi-branch matting system 102 utilizes a multi-branch neural network to generate an intermediate image matte 306 from the digital image. In particular, as illustrated in FIG. 3A, the multi-branch neural network includes a first neural network branch 308, a second neural network branch 310, and a third neural network branch 312. Each of the neural network branches performs separate operations for extracting and/or combining extracted information to generate the intermediate image matte 306.

As illustrated in FIG. 3A, the multi-branch matting system 102 utilizes the first neural network branch 308 to extract a coarse semantic mask 314 from the downsampled image 304. For example, the first neural network branch 308 includes a semantic neural network that extracts semantic information from the downsampled image 304. To illustrate, the first neural network branch 308 includes a plurality of convolutional neural network layers that detect foreground objects based on detected edges/boundaries in the downsampled image 304. Accordingly, the first neural network branch 308 generates the coarse semantic mask 314 to include a rough estimate of one or more foreground objects and estimated boundaries between the one or more foreground objects and a background region.

In additional embodiments, the multi-branch matting system 102 utilizes the first neural network branch 308 to extract intermediate image features 316 from the downsampled image 304. Specifically, the first neural network branch 308 extracts one or more feature vectors representing the content of the downsampled image 304 at a particular resolution based on a corresponding layer of the first neural network branch 308. To illustrate, the first neural network branch 308 extracts the intermediate image features 316 from the downsampled image 304 at a first convolutional neural network layer (or other layer). As illustrated in FIG.

3A, the first neural network branch 308 extracts the intermediate image features 316 for providing to the second neural network branch 310.

According to one or more embodiments, the multi-branch matting system 102 utilizes the second neural network branch 310 to extract a detail mask 318 from the downsampled image 304. For instance, the second neural network branch 310 includes a detail neural network that extracts detail information from the downsampled image 304. In particular, the second neural network branch 310 includes a plurality of convolutional neural network layers that detect edge details based on boundaries between objects (e.g., between foreground/background regions) and for edges (e.g., visual frequency changes) detected within objects. Accordingly, the second neural network branch 310 generates the detail mask 318 to include indications of portions of the downsampled image 304 corresponding to the detected edges/boundaries.

In one or more embodiments, the multi-branch matting system 102 utilizes the second neural network branch 310 to extract the detail mask 318 based on the coarse semantic mask 314 and image features extracted from the downsampled image 304. For example, the multi-branch matting system 102 extracts initial image features 320 from the downsampled image 304. To illustrate, the initial image features 320 include one or more feature vectors (e.g., low-level features) representing the content of the downsampled image 304. Additionally, as illustrated in FIG. 3A, the multi-branch matting system 102 utilizes a first combination layer 322 to combine the initial image features 320 and the intermediate image features 316 extracted by the first neural network branch 308 to provide as combined image features (e.g., multi-resolution features) to the second neural network branch 310. In some embodiments, the multi-branch matting system 102 provides the intermediate image features 316 and the initial image features 320 as separate inputs to the second neural network branch 310. Furthermore, the second neural network branch 310 includes a second combination layer 324 (e.g., after downsampling the combined image features) to integrate the coarse semantic mask 314 into the processing pipeline of the second neural network branch 310 (e.g., based on features extracted from the coarse semantic mask 314).

In one or more embodiments, as illustrated in FIG. 3A, the multi-branch matting system 102 utilizes the third neural network branch 312 to combine semantic information and detail information to generate the intermediate image matte 306. In particular, the multi-branch matting system 102 provides the coarse semantic mask 314 and the detail mask 318 to the third neural network branch 312. For instance, the third neural network branch 312 includes a plurality of convolutional neural network layers to upsample the coarse semantic mask 314. Additionally, the third neural network branch 312 includes a third combination layer 326 to combine semantic features corresponding to the coarse semantic mask 314 with detail features corresponding to the detail mask 318 at a specific resolution. The third neural network branch 312 further upsamples the combined semantic features and detail features to generate the intermediate image matte 306.

Although FIG. 3A illustrates that the multi-branch matting system 102 utilizes a multi-branch neural network to generate the intermediate image matte 306 according to a specific multi-branch processing pipeline, in alternative embodiments, the multi-branch neural network utilizes one or more modified processing pipelines. For example, in alternative embodiments, the multi-branch matting system 102 extracts initial image features and/or intermediate image features at different points than shown. In additional embodiments, the multi-branch matting system 102 utilizes neural network branches including different numbers of neural network layers or different types of neural network layers to extract a coarse semantic mask or a detail mask, or to combine the semantic information and detail information.

In response to generating the intermediate image matte 306, the multi-branch matting system 102 refines the intermediate image matte for generating a final image matte. FIG. 3B illustrates the multi-branch matting system 102 utilizing a refinement neural network 328 to generate a final image matte 330. In one or more embodiments, the multi-branch matting system 102 selectively refines portions of the intermediate image matte 306 utilizing the refinement neural network 328 to generate the final image matte 330.

For example, the multi-branch matting system 102 determines one or more portions of the intermediate image matte 306 to refine based on error values associated with the intermediate image matte 306. In particular, the multi-branch matting system 102 determines an error map 332 based on the intermediate image matte 306. To illustrate, the multi-branch matting system 102 generates the error map 332 by generated a predicted absolute residual error associated with each pixel of the intermediate image matte 306. In one or more embodiments, the multi-branch matting system 102 generates the error map 332 to estimate how closely the intermediate image matte 306 corresponds to a ground-truth image matte. For instance, the multi-branch matting system 102 utilizes a neural network to generate the error map 332 for the intermediate image matte 306 by utilizing the downsampled image 304 as a guide.

As mentioned, in one or more embodiments, the multi-branch matting system 102 determines one or portions of the intermediate image matte 306 to refine based on the error map 332. Specifically, the multi-branch matting system 102 determines portions of the error map 332 that indicate one or more erroneous regions of the intermediate image matte 306. For example, the multi-branch matting system 102 divides the intermediate image matte 306 into a plurality of patches. The multi-branch matting system 102 scores each patch of the intermediate image matte 306 according to the error values in the patch (e.g., according to the error map 332). The multi-branch matting system 102 selects the patches to refine based on the corresponding scores, such as by selecting patches with the top-k scores.

In alternative embodiments, the multi-branch matting system 102 selects one or more patches to refine based on an error threshold. For example, the multi-branch matting system 102 compares refinement scores of the patches of the intermediate image matte 306 to a predetermined error threshold. To illustrate, the error threshold includes an error value associated with a given patch, such as an allowable average error value (e.g., based on absolute error values) for pixels in the given patch. Accordingly, the multi-branch matting system 102 determines portions of the intermediate image matte 306 to refine based on whether the average absolute error value for each patch meets the error threshold.

Accordingly, as illustrated in FIG. 3B, the multi-branch matting system 102 selects a plurality of patches 334a-334c from the intermediate image matte 306 to provide separately to the refinement neural network 328. In one or more embodiments, the multi-branch matting system 102 utilizes the refinement neural network 328 to refine each of the selected patches without refining all portions of the intermediate image matte 306 via the refinement neural network 328. FIG. 3B illustrates that the multi-branch matting system 102 generates a plurality of refined patches 336a-336c based on the plurality of patches 334a-334c at a higher resolution than the intermediate image matte 306. To illustrate, the multi-branch matting system 102 utilizes the refinement neural network 328 to generate the refined patches 336a-336c based on the digital image 300 of FIG. 3A, an upsampled image matte based on the intermediate image matte 306 at an increased resolution, and matting features extracted from the intermediate image matte 306

In one or more additional embodiments, the multi-branch matting system 102 combines the refined patches 336a-336c with unrefined portions of the intermediate image matte 306 of the upsampled image matte. For example, the multi-branch matting system 102 determines positions (e.g., coordinates) of the refined patches 336a-336c within the upsampled image matte. The multi-branch matting system 102 replaces the unrefined patches of the upsampled image matte with the refined patches 336a-336c. To illustrate, the multi-branch matting system 102 replaces transparency values of pixels of a patch of the upsampled image matte with the transparency values of a corresponding refined patch.

According to one or more embodiments, as described in FIGS. 3A-3B, the multi-branch matting system 102 utilizes a matting pipeline to process an image I by generating a downsampled image $$I_{mid} \in R^{C \times \frac{H}{4} \times \frac{W}{4}},$$

in which H and W represent the height and width of the image I, respectively. In one or more embodiments, the multi-branch matting system 102 generates the downsampled image $I_{mid}$ by downsampling by a factor of ¼. The multi-branch matting system 102 generates, from the downsampled image $I_{mid}$, an intermediate image matte $$M_{mid} \in R^{C \times \frac{H}{4} \times \frac{W}{4}}.$$

Additionally, the multi-branch matting system 102 generates a final image matte $M \in R^{H \times W}$ by upsampling $M_{mid}$ and refining specific patches using high resolution features extracted from the original image I.

Specifically, in one or more embodiments, the multi-branch matting system 102 utilizes a multi-branch neural network to process the downsampled image $I_{mid}$. For example, the multi-branch neural network includes a semantic neural network branch that generates a coarse semantic mask $$M_{sem} \in R^{\frac{H}{32} \times \frac{W}{32}}$$

from $I_{mid}$. Additionally, the semantic neural network branch also generates intermediate image features $$x_{sem} \in R^{C_{sem} \times \frac{H}{32} \times \frac{W}{32}}$$

and provides the intermediate features $x_{sem}$ and the coarse semantic mask $M_{sem}$ to a detail neural network branch (e.g., through bilinear up sampling). In one or more embodiments, the detail neural network branch generates a detail mask $$M_{det} \in R^{\frac{H}{4} \times \frac{W}{4}}$$

by processing low-level image features $x_{low}$ extracted from the downsampled image $I_{mid}$, the intermediate image features $x_{sem}$, and the coarse semantic mask $M_{sem}$.

In one or more embodiments, the multi-branch matting system 102 constrains the detail neural network branch to predict local details within the transition regions between foreground and background regions without optimizing for central portions of the foreground region. Accordingly, the multi-branch matting system 102 utilizes the detail neural network branch to determine local details of the downsampled image $I_{mid}$ and the semantic neural network branch to determine global details of the downsampled image $I_{mid}$. The multi-branch matting system 102 thus utilizes the fusion neural network branch to combine the local details on the foreground boundary with the low resolution semantic/global details to generate the intermediate image matte $M_{mid}$.

Furthermore, in one or more embodiments, the multi-branch matting system 102 further refines the intermediate image matte $M_{mid}$ via a refinement neural network. Specifically, the multi-branch matting system 102 obtains a high resolution image matte M by first dividing the intermediate image matte $M_{mid}$ into patches. The multi-branch matting system 102 selectively refines a subset of patches of the intermediate image matte $M_{mid}$ via the refinement neural network. Additionally, in one or more embodiments, the multi-branch matting system 102 upsamples the intermediate image matte $M_{mid}$ to a resolution of H×W and divides the upsampled image matte into patches $$P_{ij} \in R^{\frac{H}{64} \times \frac{W}{64}}.$$

The multi-branch matting system 102 generates predicted refinement scores for the patches and selects the top-k scored patches for refinement via the refinement neural network.

In one or more embodiments, the multi-branch matting system 102 refines the patches by incorporating the image I, the upsampled image matte, and intermediate image features $x_{mid} \in R^{C_{mid} \times H \times W}$ extracted from the intermediate image matte $M_{mid}$. According to one or more embodiments, the multi-branch matting system 102 utilizes the refinement neural network including a plurality of convolutional neural network layers to process the selected patches into alpha patches at a higher resolution. In additional embodiments, the multi-branch matting system 102 generates the final image matte by replacing pixels in corresponding locations of the upsampled image matte with the refined patches.

Figure 4:
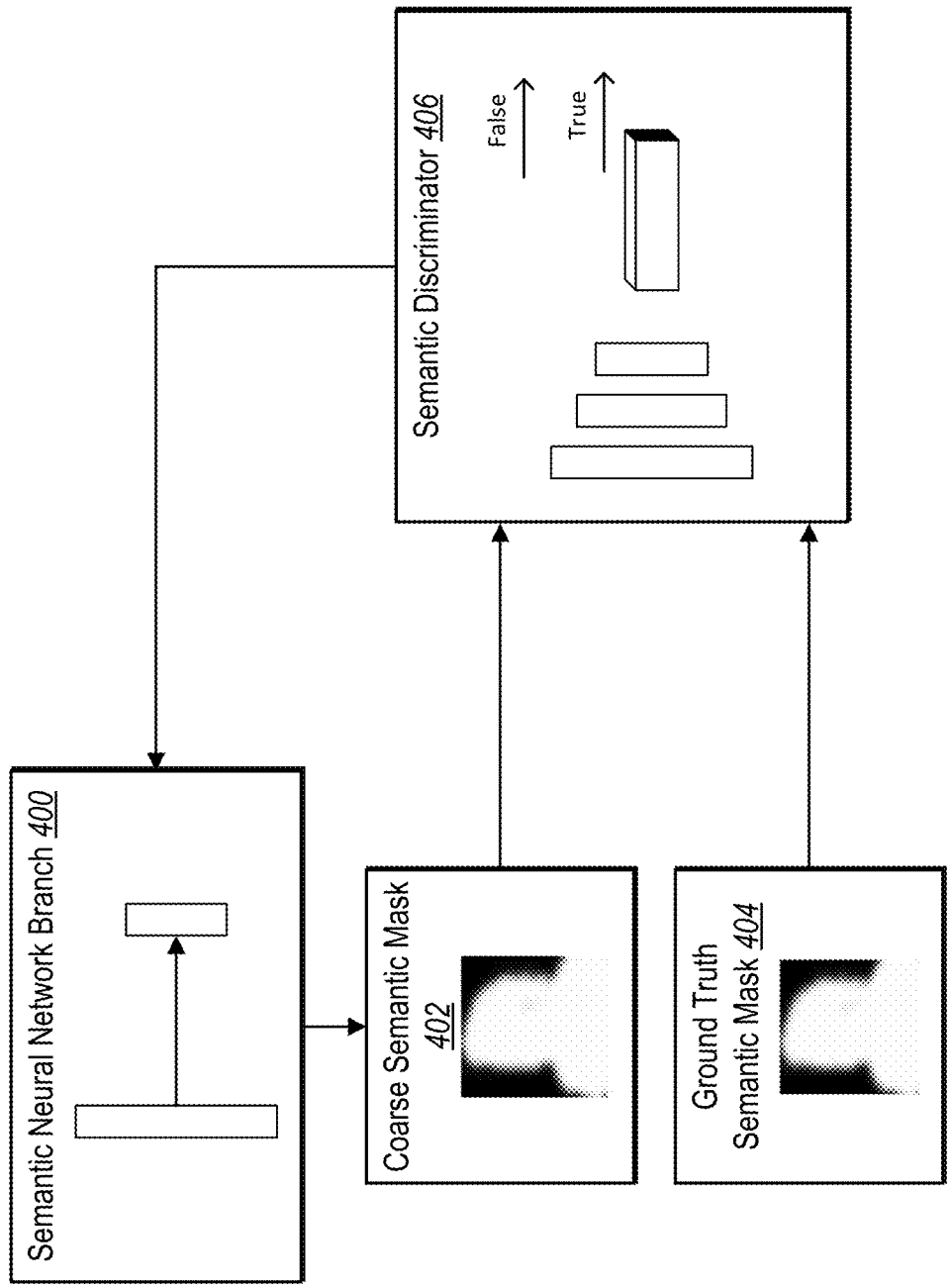
FIG. 4 illustrates a diagram of the multi-branch matting system learning parameters of a semantic neural network branch of a multi-branch neural network via adversarial training in accordance with one or more implementations.
Figure 5:
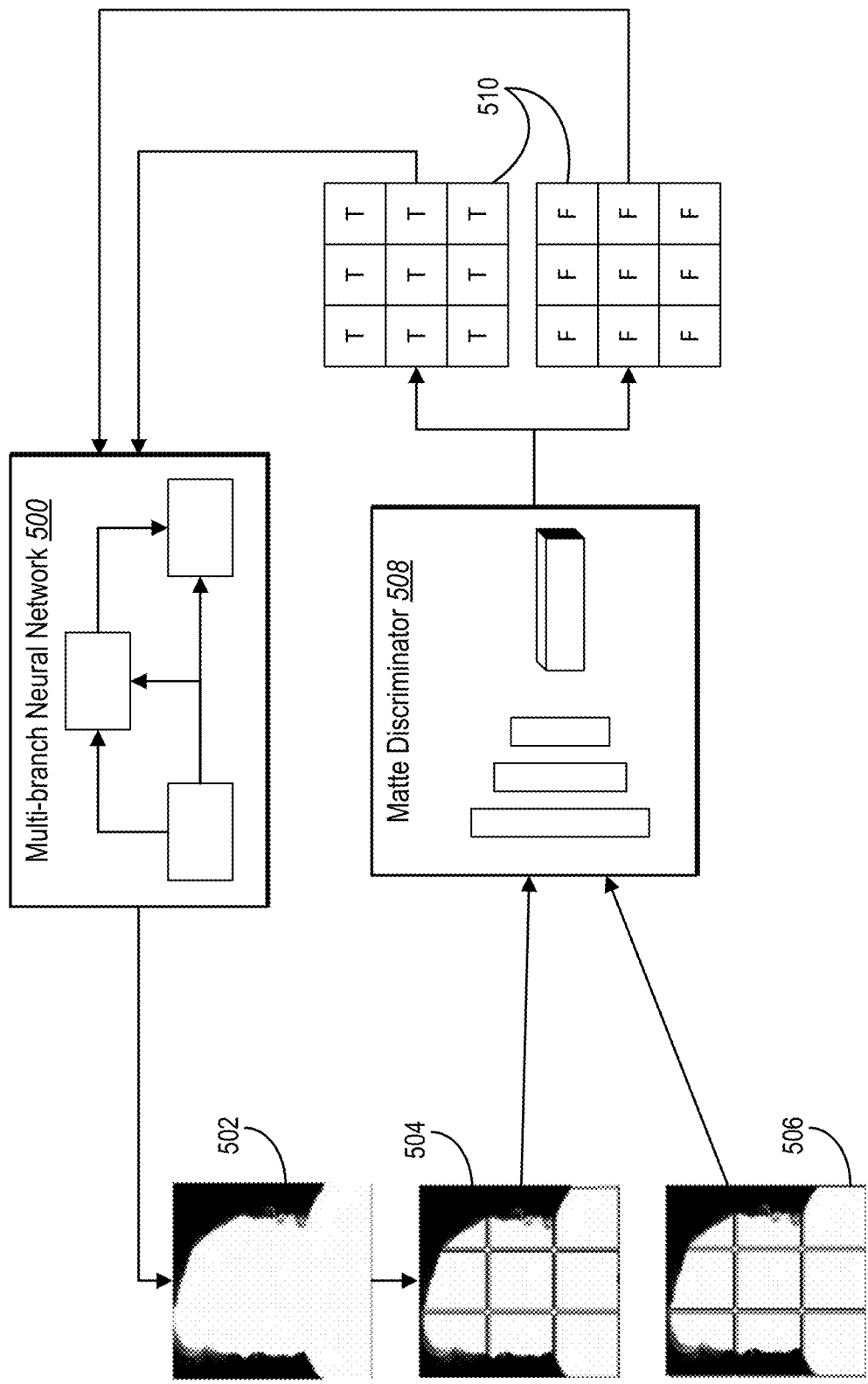
FIG. 5 illustrates a diagram of the multi-branch matting system learning parameters of a multi-branch neural network via adversarial training in accordance with one or more implementations.

In one or more embodiments, the multi-branch matting system 102 also determines one or more adversarial losses associated with one or more neural network layers or neural network branches to train the multi-branch neural network. For example, FIG. 4 illustrates that the multi-branch matting system 102 determines a semantic adversarial loss to train a semantic neural network branch of the multi-branch neural network. FIG. 5 illustrates that the multi-branch matting system 102 determines a matte adversarial loss to train one or more branches of the multi-branch neural network.

As illustrated in FIG. 4, the multi-branch matting system 102 utilizes a semantic neural network branch 400 to extract a coarse semantic mask 402 for a digital image, as described in more detail above with respect to FIG. 3A. In addition, in one or more embodiments, the multi-branch matting system 102 determines a ground-truth semantic mask 404 corresponding to the digital image. For example, the ground-truth semantic mask 404 includes a user-generated semantic mask including labels of foreground and background regions. Alternatively, the ground-truth semantic mask 404 includes a mask generated via a different neural network (e.g., utilizing a trimap segmentation of the digital image).

In one or more embodiments, the multi-branch matting system 102 determines a loss by comparing the coarse semantic mask 402 to the ground-truth semantic mask 404. Specifically, the multi-branch matting system 102 utilizes a semantic discriminator 406 to determine a semantic adversarial loss based on a difference between the coarse semantic mask 402 and the ground-truth semantic mask 404. For example, the semantic discriminator 406 includes a classifier neural network that classifies the coarse semantic mask 402 as "true" or "false" based on the comparison of the coarse semantic mask 402 and the ground-truth semantic mask 404.

In response to determining a semantic adversarial loss corresponding to the coarse semantic mask 402, the multi-branch matting system 102 updates the semantic neural network branch 400. In particular, the multi-branch matting system 102 utilizes the semantic adversarial loss to update parameters (e.g., weights) associated with one or more neural network layers in the semantic neural network branch 400. Accordingly, the multi-branch matting system 102 utilizes adversarial training to improve the performance of the semantic neural network branch 400 to generate a coarse semantic mask closer to the ground-truth semantic mask 404. In some embodiments, the multi-branch matting system 102 performs a plurality of iterations of mask generation and training to modify the parameters of the semantic neural network branch 400.

Additionally, as mentioned, FIG. 5 illustrates that the multi-branch matting system 102 utilizes a multi-branch neural network 500 to generate an image matte 502, as described in more detail above with respect to FIG. 3A. In one or more embodiments, the multi-branch matting system 102 also segments the image matte 502 into a plurality of patches 504. For example, the multi-branch matting system 102 generates the patches 504 including portions of predetermined size at different locations of the image matte 502. In one or more embodiments, the multi-branch matting system 102 also determines a ground-truth image matte including a plurality of ground-truth patches 506 at the positions corresponding to the patches 504.

Furthermore, in one or more embodiments, the multi-branch matting system 102 utilizes a matte discriminator 508 to compare the patches 504 of the image matte 502 to the ground-truth patches 506 of the ground-truth image matte. For instance, the matte discriminator 508 includes a classification neural network that compares the patches 504 of the image matte 502 to the corresponding ground-truth patches 506 of the ground-truth image matte. To illustrate, the multi-branch matting system 102 utilizes the matte discriminator 508 to generate classifications 510 indicating whether the respective patches classify as "true" or "false" based on differences between the patches 504 and the ground-truth patches 506.

According to one or more embodiments, the multi-branch matting system 102 determines a matte adversarial loss based on the classifications 510 corresponding to the patches 504 of the image matte 502. The multi-branch matting system 102 utilizes the matte adversarial loss to update the multi-branch neural network 500. For instance, the multi-branch matting system 102 updates parameters (e.g., weights) of one or more of the branches of the multi-branch neural network 500 according to the matte adversarial loss. To illustrate, the multi-branch matting system 102 updates parameters of a semantic neural network branch, a detail neural network branch, and/or a fusion neural network branch of the multi-branch neural network 500 according to the matte adversarial loss (e.g., via backpropagation).

According to one or more embodiments, the multi-branch matting system 102 utilizes a loss function that determines a plurality of losses for updating a plurality of components of the multi-branch neural network and/or the generative neural network including the refinement neural network. The multi-branch matting system 102 utilizes the loss to update parameters of one or more components via fully supervised prediction error minimization and adversarial training. Specifically, the multi-branch matting system 102 determines a loss function including a plurality of separate loss functions as $\mathcal{L} = \mathcal{L}_{sem} + \mathcal{L}_{det} + \mathcal{L}_{mid} + \mathcal{L}_{high}$. Additionally, each of the separate loss functions are indicated below:

$$\mathcal{L}_{sem} = \frac{1}{N_{sem}} \sum_{i=1}^{N_{sem}} (M_{sem}(i) - Q_{sem}(i))^2$$

$$\mathcal{L}_{det} = \frac{1}{N_{det}} \sum_{i=1}^{N_{det}} Q_{trans}(i) \cdot |M_{det}(i) - Q_{det}(i)|$$

$$\mathcal{L}_{mid} = \frac{1}{N_{mid}} \sum_{i=1}^{N_{mid}} (|M_{mid}(i) - Q_{mid}(i)| + 10 \cdot Q_{trans}(i) \cdot |M_{mid}(i) - Q_{mid}(i)|)$$

$$\mathcal{L}_{high} = \frac{1}{N_{high}} \sum_{i=1}^{N_{high}} (|M_{high}(i) - Q_{high}(i)| + 10 \cdot Q_{trans}(i) \cdot |M_{high}(i) - Q_{high}(i)|)$$

in which $Q_{(\cdot)}$ represents the ground-truth of a prediction and $N_{(\cdot)}$ represents the number of samples.

In one or more embodiments, the multi-branch matting system 102 trains the generative neural network under a set of strong supervisions. To account for artifacts that may be caused by false positive semantic prediction or imperfect predictions in the intermediate image matte, the multi-branch matting system 102 regularizes the foreground shape via adversarial training. The multi-branch matting system 102 determines the adversarial loss in connection with the following min-max algorithms:

$$\min_{G_{sem}D_{sem}}\max |\mathcal{L}_{semgan}(G_{sem}, D_{sem}) + \lambda_{sem} \cdot \mathcal{L}_{L1}(G_{sem})|$$

$$\arg\min_{G_{sem}D_{sem}}\max |\mathcal{L}_{matgan}(G_{mat}, D_{mat}) + \lambda_{mat} \cdot \mathcal{L}_{L1}(G_{mat})|$$

Furthermore $\mathcal{L}_{semgan}$ and $\mathcal{L}_{matgan}$ are represented as:

$$\mathcal{L}_{semgan} = \mathbb{E}_{M_{sem}}(\ln D_{sem}(M_{sem})) + \mathbb{E}_{M_{mid}} \ln(1 - D_{sem}(G_{sem}(I_{mid})))$$

$$\mathcal{L}_{matgan} = \sum_{i,j} \mathbb{E}_{P_{i,j}}(\ln D_{mat}(P_{i,j})) + \mathbb{E}_{P_{i,j}} \ln(1 - D_{mat}(G_{mat}(I_{mid})))$$

where $D_{(\cdot)}$ represents a discriminator model and $G_{(\cdot)}$ represents a generator model. In one or more embodiments, the multi-branch matting system 102 implements the discriminator models $D_{sem}$, $D_{mat}$ with independent convolutional neural networks. In additional embodiments, the multi-branch matting system 102 implements the generator models $G_{sem}$, $G_{mat}$ with the same model as the multi-branch neural network.

Figure 6:
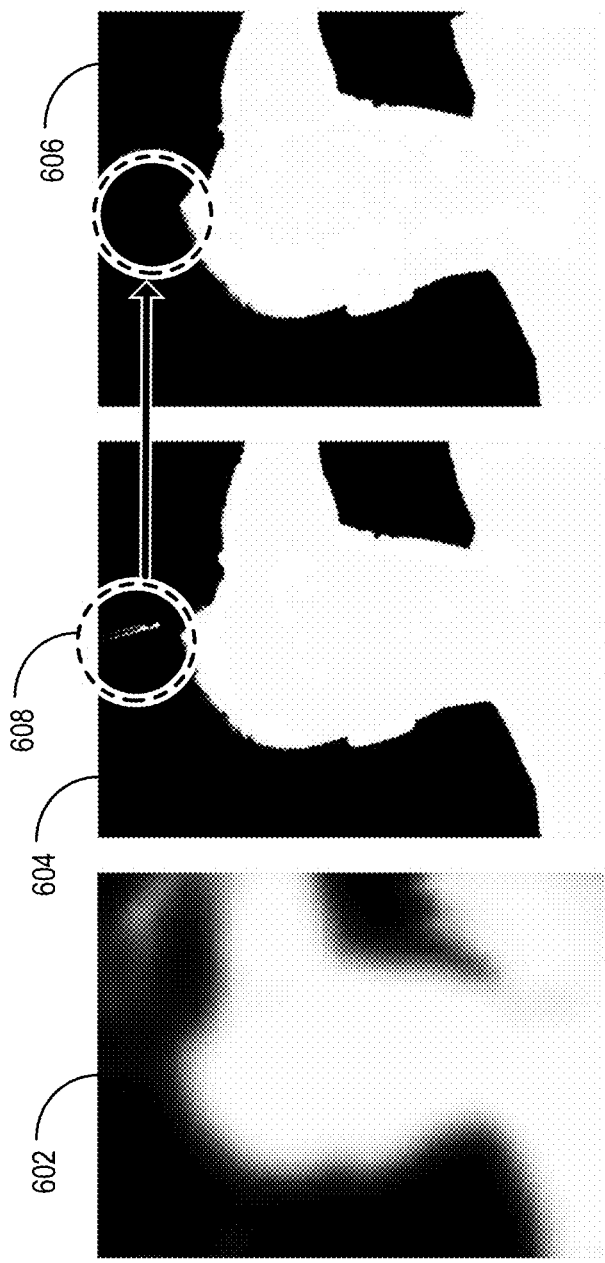
FIG. 6 illustrates a coarse semantic mask and image mattes generated from a digital image in accordance with one or more implementations.
Figure 6:

FIG. 6 illustrate a plurality of images in connection with generating an image matte from a digital image. Specifically, FIG. 6 illustrates a digital image 600 including a foreground object (e.g., a human) and a background including one or more objects behind the foreground object. FIG. 6 also illustrates a coarse semantic mask 602 that the multi-branch matting system 102 generates via a semantic neural network branch of a multi-branch neural network. Specifically, the coarse semantic mask 602 includes a low-resolution segmentation of the digital image 600 according to roughly estimated foreground regions and background regions of the digital image 600.

FIG. 6 also illustrates an image matte 604 generated by the multi-branch matting system 102 without adversarial training of the multi-branch neural network and an image matte 606 generated by the multi-branch matting system with adversarial training. As shown, the image matte 604 generated by the multi-branch matting system 102 without adversarial training of the multi-branch neural network includes an artifact 608 corresponding to an edge detected in the digital image 600 outside the boundaries of the foreground region. In contrast, the image matte 606 generated by the multi-branch matting system 102 with adversarial training of the multi-branch neural network excludes the artifact 608.

Figure 7:
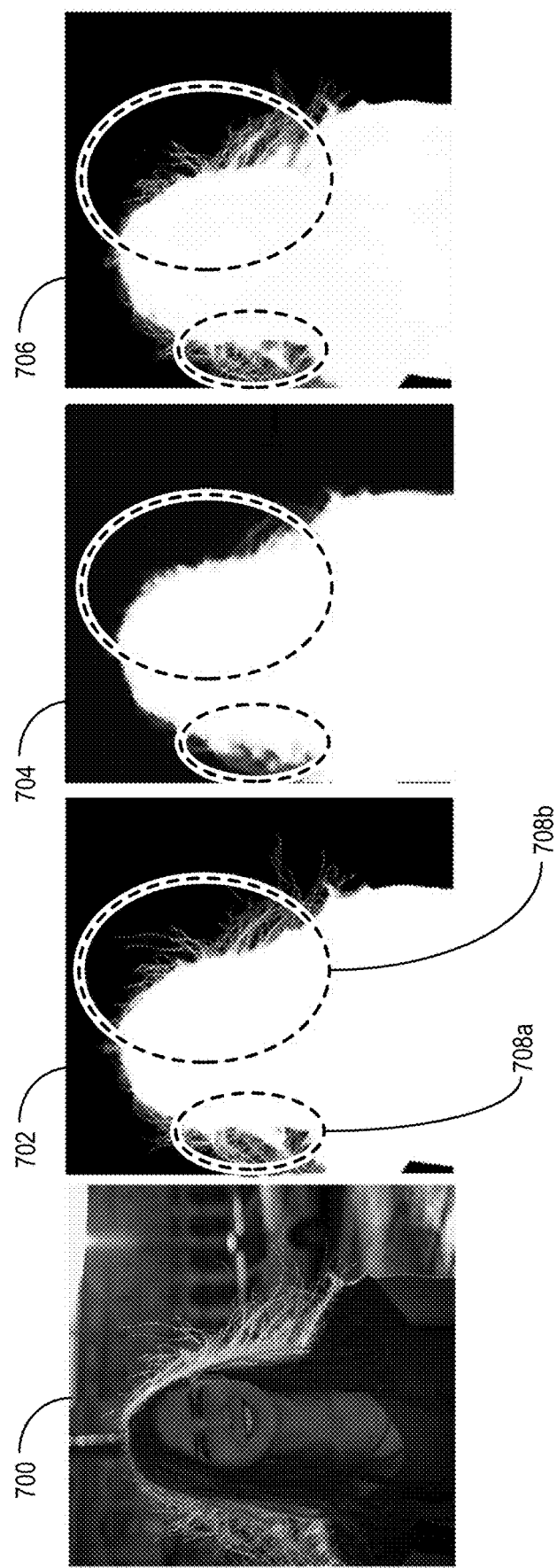
FIG. 7 illustrates image mattes generated for a digital image by the multi-branch matting system and existing image matting systems in accordance with one or more implementations.

FIG. 7 illustrates a plurality of images comparing image mattes generated for a digital image 700. In particular, FIG. 7 illustrates a first image matte 702 generated by the multi-branch matting system 102. FIG. 7 also illustrates a second image matte 704 and a third image matte 706 generated by existing image matting systems. As illustrated in FIG. 7, the first image matte 702 generated by the multi-branch matting system 102 more accurately distinguishes the foreground regions in a hair region of the digital image 700 than the second image matte 704 and the third image matte 706 generated by the existing systems (as indicated in a first highlighted portion 708a and a second highlighted portion 708b of the first image matte 702). In particular, as illustrated in FIG. 7, the second image matte 704 includes blurry/inaccurate details for much of the hair region, while the third image matte 706 inaccurately detects some details in the hair region.

Figure 8:
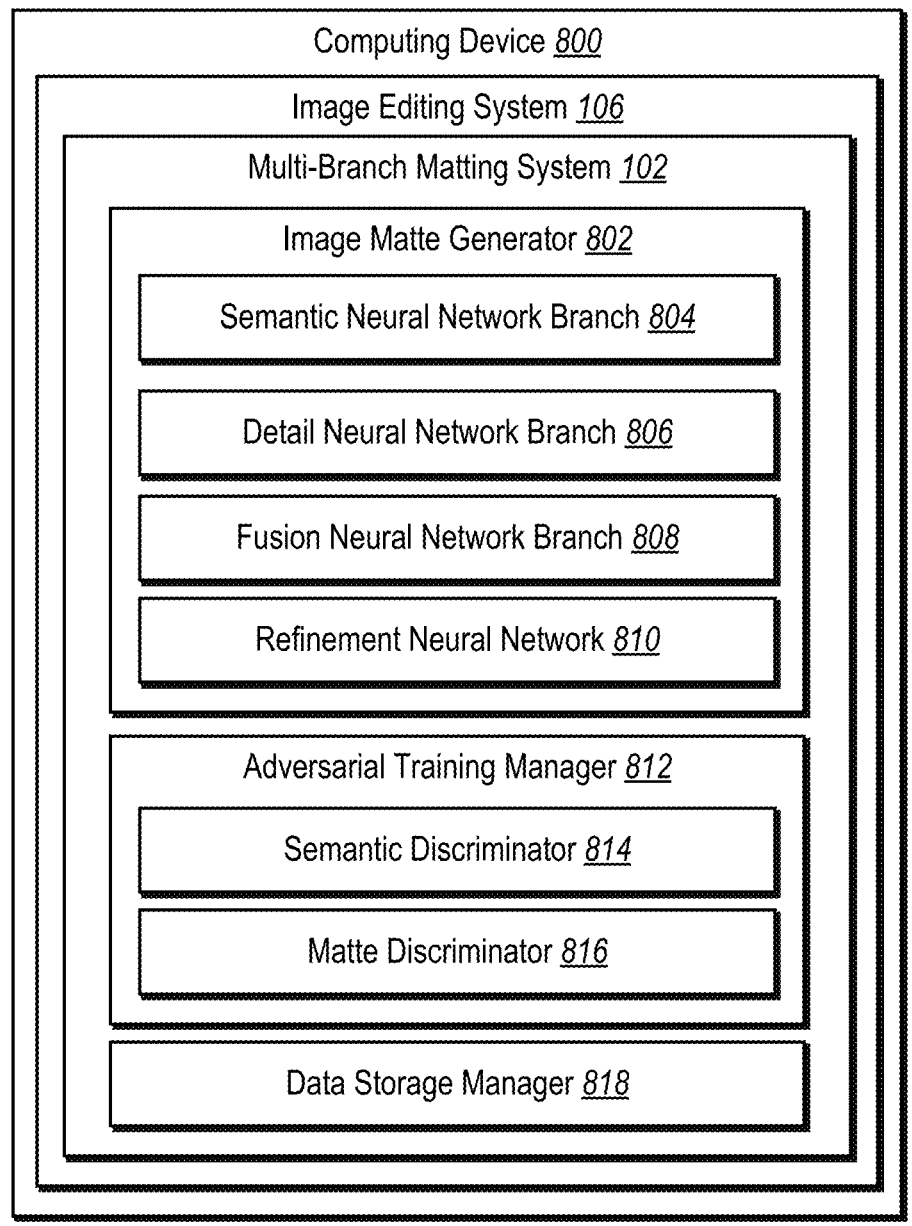
FIG. 8 illustrates a diagram of the multi-branch matting system of FIG. 1 in accordance with one or more implementations.

FIG. 8 illustrates a detailed schematic diagram of an embodiment of the multi-branch matting system 102 described above. As shown, the multi-branch matting system 102 is implemented in an image editing system 110 on computing device(s) 800 (e.g., a client device and/or server device as described in FIG. 1, and as further described below in relation to FIG. 10). Additionally, the multi-branch matting system 102 includes, but is not limited to: an image matte generator 802 that includes a semantic neural network branch 804, a detail neural network branch 806, a fusion neural network branch 808, and a refinement neural network 810; an adversarial training manager 812 that includes a semantic discriminator 814 and a matte discriminator 816; and a data storage manager 818. The multi-branch matting system 102 can be implemented on any number of computing devices. For example, the multi-branch matting system 102 can be implemented in a distributed system of server devices for digital images. The multi-branch matting system 102 can also be implemented within one or more additional systems. Alternatively, the multi-branch matting system 102 can be implemented on a single computing device such as a single client device.

In one or more embodiments, each of the components of the multi-branch matting system 102 is in communication with other components using any suitable communication technologies. Additionally, the components of the multi-branch matting system 102 are capable of being in communication with one or more other devices including other computing devices of a user, server devices (e.g., cloud storage devices), licensing servers, or other devices/systems. It will be recognized that although the components of the multi-branch matting system 102 are shown to be separate in FIG. 8, any of the subcomponents may be combined into fewer components, such as into a single component, or divided into more components as may serve a particular implementation. Furthermore, although the components of FIG. 8 are described in connection with the multi-branch matting system 102, at least some of the components for performing operations in conjunction with the multi-branch matting system 102 described herein may be implemented on other devices within the environment.

In some embodiments, the components of the multi-branch matting system 102 include software, hardware, or both. For example, the components of the multi-branch matting system 102 include one or more instructions stored on a computer-readable storage medium and executable by processors of one or more computing devices (e.g., the computing device(s) 800). When executed by the one or more processors, the computer-executable instructions of the multi-branch matting system 102 cause the computing device(s) 800 to perform the operations described herein. Alternatively, the components of the multi-branch matting system 102 include hardware, such as a special purpose processing device to perform a certain function or group of functions. Additionally, or alternatively, the components of the multi-branch matting system 102 include a combination of computer-executable instructions and hardware.

Furthermore, the components of the multi-branch matting system 102 performing the functions described herein with respect to the multi-branch matting system 102 may, for example, be implemented as part of a stand-alone application, as a module of an application, as a plug-in for applications, as a library function or functions that may be called by other applications, and/or as a cloud-computing model. Thus, the components of the multi-branch matting system 102 may be implemented as part of a stand-alone application on a personal computing device or a mobile device. Alternatively, or additionally, the components of the multi-branch matting system 102 may be implemented in any application that provides digital image modification, including, but not limited to ADOBE® PHOTOSHOP® and ADOBE® CREATIVE CLOUD®.

As illustrated in FIG. 8, the multi-branch matting system 102 includes the image matte generator 802 to generate image mattes from digital images. Specifically, the image matte generator 802 utilizes a generative neural network including the semantic neural network branch 804, the detail neural network branch 806, and the fusion neural network branch 808. For example, the image matte generator 802 utilizes the semantic neural network branch 804 to generate a coarse semantic mask for a digital image. The image matte generator 802 utilizes the detail neural network branch 806 to generate a detail mask for the digital image. The image matte generator 802 also utilizes the fusion neural network branch 808 to generate an intermediate matte based on the coarse semantic mask and the detail mask.

Additionally, the image matte generator 802 utilizes the refinement neural network 810 to refine one or more portions of an image matte. For example, the image matte generator 802 generates refinement scores for portions of an intermediate image matte generated by the fusion neural network branch 808 according to error values associated with the intermediate image matte. The image matte generator 802 utilizes the refinement neural network 810 to refine selected portions of the intermediate image matte according to the refinement scores and generate a final image matte.

In one or more embodiments, the multi-branch matting system 102 includes the adversarial training manager 812 to train one or more components of the image matte generator 802. For instance, the adversarial training manager 812 utilizes the semantic discriminator 814 to generate an adversarial loss based on a coarse semantic mask generated by the semantic neural network branch 804. To illustrate, the semantic discriminator 814 includes a neural network to classify the coarse semantic mask based on a ground-truth semantic mask. The adversarial training manager 812 utilizes the classification of the coarse semantic mask to train the semantic neural network branch 804.

The adversarial training manager 812 also utilizes the matte discriminator 816 to generate an adversarial loss based on an image matte generated by the fusion neural network branch 808. For example, the matte discriminator 816 includes a neural network to classify portions of the image matte based on ground-truth portions of a ground-truth image matte. The adversarial training manager 812 utilizes the classifications of the portions of the image matte to train the semantic neural network branch 804, the detail neural network branch 806, and/or the fusion neural network branch 808.

The multi-branch matting system 102 also includes a data storage manager 818 (that comprises a non-transitory computer memory/one or more memory devices) that stores and maintains data associated with generating image mattes of digital images. For example, the data storage manager 818 stores data associated with neural network branches of a multi-branch neural network for generating image mattes. To illustrate, the data storage manager 818 stores digital images, coarse semantic masks, detail masks, image features, and image mattes. Furthermore, the data storage manager 818 stores data associated with refining image mattes, such as refinement scores, patches of image mattes, and reconstructed/upsampled image mattes.

Figure 9:
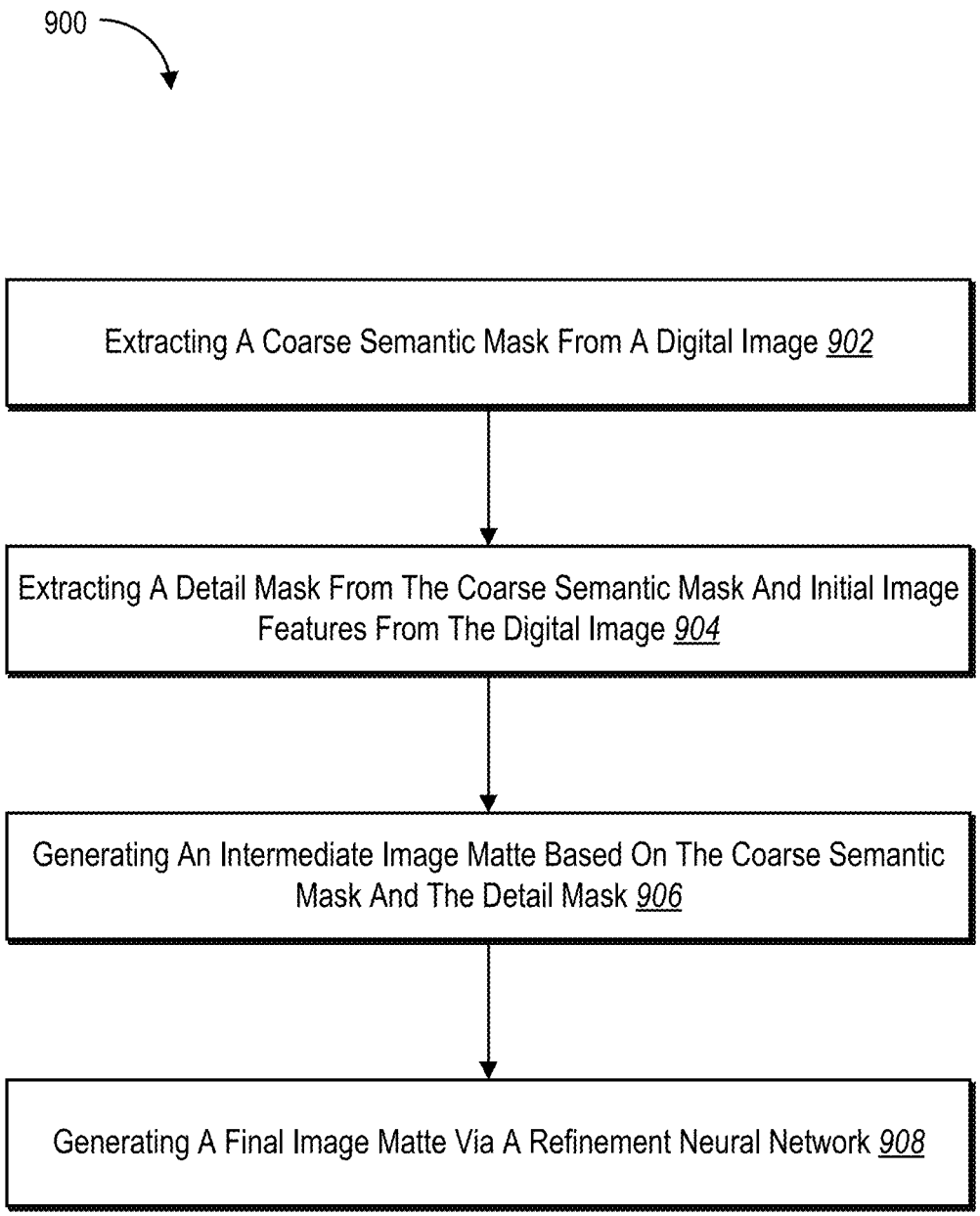
FIG. 9 illustrates a flowchart of a series of acts for generating an image matte for a digital image via a multi-branch neural network in accordance with one or more implementations.

Turning now to FIG. 9, this figure shows a flowchart of a series of acts 900 of generating an image matte for a digital image via a multi-branch neural network. While FIG. 9 illustrates acts according to one embodiment, alternative embodiments may omit, add to, reorder, and/or modify any of the acts shown in FIG. 9. The acts of FIG. 9 are part of a method. Alternatively, a non-transitory computer readable medium comprises instructions, that when executed by one or more processors, cause the one or more processors to perform the acts of FIG. 9. In still further embodiments, a system includes a processor or server configured to perform the acts of FIG. 9.

As shown, the series of acts 900 includes an act 902 of extracting a coarse semantic mask from a digital image. For example, act 902 involves extracting, utilizing a first neural network branch of a generative neural network, a coarse semantic mask from a digital image. In one or more embodiments, act 902 involves extracting, utilizing a first neural network branch of a generative neural network, a coarse semantic mask and intermediate image features from a digital image.

In one or more embodiments, act 902 involves extracting, utilizing the first neural network branch, the coarse semantic mask and intermediate image features from a downsampled image extracted from the digital image. For example, act 902 involves generating, utilizing a downsampling neural network layer, a downsampled image at a resolution lower than an original resolution of the digital image. Act 902 involves extracting, utilizing the first neural network branch, the coarse semantic mask and the intermediate image features from the downsampled image.

The series of acts 900 includes an act 904 of extracting a detail mask from the coarse semantic mask and initial image features from the digital image. For example, act 904 involves extracting, utilizing a second neural network branch of the generative neural network, a detail mask from the coarse semantic mask and initial image features extracted from the digital image. In one or more embodiments, act 904 involves extracting the initial image features from the downsampled image. In one or more embodiments, act 904 involves extracting, utilizing a second neural network branch of the generative neural network, a detail mask from the coarse semantic mask and the intermediate image features generated by the first neural network branch and initial image features extracted from the digital image.

In one or more embodiments, act 904 involves extracting, utilizing the second neural network branch, the detail mask based on the coarse semantic mask, the intermediate image features, and the initial image features extracted from the downsampled image. For example, act 904 involves determining multi-resolution image features based on the initial image features and the intermediate image features. Act 904 involves extracting, utilizing the second neural network branch, the detail mask based on the multi-resolution image features and the coarse semantic mask. For example, act 904 involves extracting, utilizing a detail neural network branch of the multi-branch neural network, the detail mask based on the coarse semantic mask and multi-resolution image features comprising the initial image features and the intermediate image features.

Additionally, the series of acts 900 includes an act 906 of generating an intermediate image matte based on the coarse semantic mask and the detail mask. For example, act 906 involves generating, utilizing a third neural network branch of the generative neural network, an image matte based on the coarse semantic mask and the detail mask. In one or more embodiments, act 906 involves generating, utilizing a third neural network branch of the generative neural network; an intermediate image matte by fusing semantic features from the coarse semantic mask and detail features from the detail mask.

In one or more embodiments, act 906 involves combining semantic features of the coarse semantic mask and detail features of the detail mask utilizing the third neural network branch. For example, act 906 involves combining detail features from the detail mask at one or more boundaries of an object with features corresponding to the object from the coarse semantic mask into the image matte.

In one or more embodiments, act 906 involves determining, utilizing the third neural network branch, the semantic features of the coarse semantic mask. For example, act 906 also involves determining, utilizing the third neural network branch, combined features based on the semantic features of the coarse semantic mask and the detail features of the detail mask from the second neural network branch. Additionally, act 906 also involves generating, utilizing the third neural network branch, the intermediate image matte based on the combined features.

The series of acts 900 also includes an act 908 of generating a final image matte via a refinement neural network. For example, act 908 involves generating, utilizing a refinement neural network, a final image matte by refining one or more portions of the intermediate image matte.

In one or more embodiments, act 908 involves generating an error map comprising error values associated with a plurality of portions of the intermediate image matte. Act 908 can involve determining, based on the error map, that error values of the one or more portions of the intermediate image matte exceed an error threshold. Act 908 can also involve refining, utilizing the refinement neural network, the one or more portions in response to the error values of the intermediate image matte exceeding the error threshold.

In one or more embodiments, act 908 involves determining, based on the image matte, an error map comprising indications of one or more edges at a boundary between a foreground region and a background region. Act 908 further involves generating, utilizing a refinement neural network, a final image matte by refining one or more portions of the image matte according to the error map.

In one or more embodiments, act 908 involves determining a subset of portions of a plurality of portions of the image matte based on error values in the error map. Additionally, act 908 involves refining, utilizing the refinement neural network, the subset of portions of the plurality of portions of the image matte without refining one or more additional portions of the image matte. In one or more embodiments, act 908 also involves generating the final image matte by upsampling the subset of portions and the one or more additional portions of the image matte.

In one or more embodiments, act 908 involves determining the one or more portions of the intermediate image matte in response to the one or more portions comprising predicted error values above an error threshold. For example, act 908 involves refining, utilizing the refinement neural network, the one or more portions of the intermediate image matte. Act 908 can involve combining the refined one or more portions of the intermediate image matte with one or more unrefined portions of the intermediate image matte.

In one or more embodiments, the series of acts 900 includes comparing, utilizing a semantic discriminator neural network, the coarse semantic mask generated by the first neural network branch to a ground-truth semantic mask corresponding to the digital image. In one or more embodiments, the series of acts 900 includes generating, utilizing the semantic discriminator neural network, a discriminator classification corresponding to the coarse semantic mask relative to the ground-truth semantic mask. According to one or more embodiments, the series of acts 900 includes learning parameters of the first neural network branch based on the discriminator classification.

In one or more embodiments, the series of acts 900 includes comparing, utilizing a matte discriminator neural network, a plurality of portions of the image matte to a plurality of portions of a ground-truth image matte. According to one or more embodiments, the series of acts 900 includes generating, utilizing the matte discriminator neural network, a plurality of discriminator classifications based on comparisons of the plurality of portions of the image matte to the plurality of portions of the ground-truth image matte. In some embodiments, the series of acts 900 includes learning parameters of one or more branches of the generative neural network based on the plurality of discriminator classifications.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
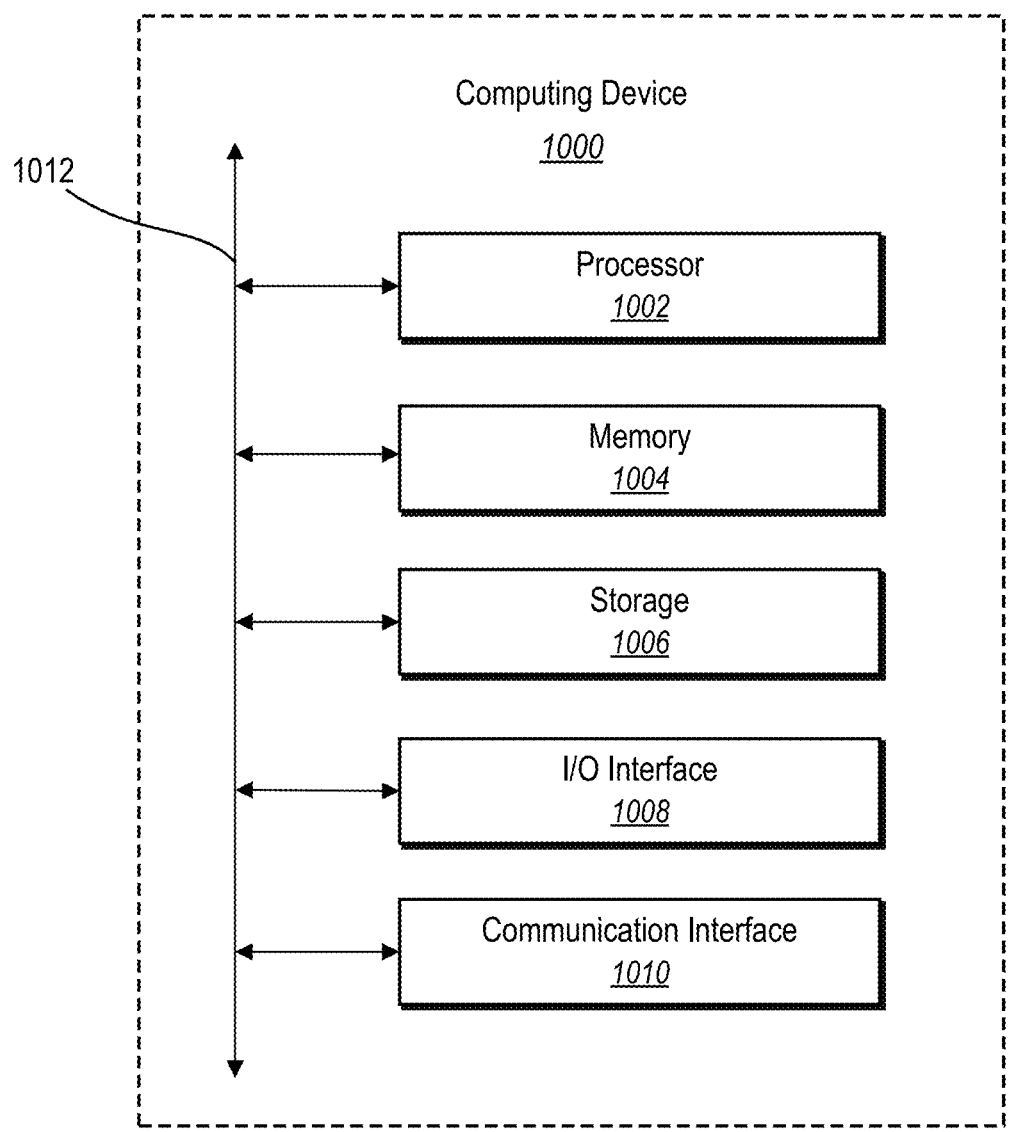
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
extracting, by at least one processor utilizing a first neural network branch of a generative neural network, a coarse semantic mask from a digital image;
extracting, by the at least one processor utilizing a second neural network branch of the generative neural network, a detail mask from the coarse semantic mask and initial image features extracted from the digital image;
generating, by the at least one processor utilizing a third neural network branch of the generative neural network, an intermediate image matte by fusing the coarse semantic mask and the detail mask; and
generating a final image matte by:
dividing the intermediate image matte into a plurality of patches, having a predetermined size and corresponding to different coordinates of the intermediate image matte;
determining a selected subset of patches of the plurality of patches based on error values corresponding to the plurality of patches from an error map comprising predicted absolute residual errors of pixels of the intermediate image matte; and
refining the selected subset of patches of the intermediate image matte utilizing a refinement neural network.

2. The method of claim 1, wherein extracting the coarse semantic mask comprises extracting, utilizing the first neural network branch, the coarse semantic mask and intermediate image features from a downsampled image extracted from the digital image.

3. The method of claim 2, wherein extracting the detail mask comprises extracting, utilizing the second neural network branch, the detail mask based on the coarse semantic mask, the intermediate image features, and the initial image features extracted from the downsampled image.

4. The method of claim 3, wherein generating the intermediate image matte comprises combining semantic features of the coarse semantic mask and detail features of the detail mask utilizing the third neural network branch.

5. The method of claim 4, wherein combining the semantic features of the coarse semantic mask and the detail features of the detail mask comprises combining detail features from the detail mask at one or more boundaries of an object with features corresponding to the object from the coarse semantic mask into the intermediate image matte.

6. The method of claim 1, further comprising:
comparing, utilizing a semantic discriminator neural network, the coarse semantic mask generated by the first neural network branch to a ground-truth semantic mask corresponding to the digital image;
generating, utilizing the semantic discriminator neural network, a discriminator classification corresponding to the coarse semantic mask relative to the ground-truth semantic mask;
determining a matte adversarial loss based on the discriminator classification; and
learning parameters of the first neural network branch utilizing the matte adversarial loss based on the discriminator classification.

7. The method of claim 1, further comprising:
comparing, utilizing a matte discriminator neural network, a set of patches of the intermediate image matte to an additional set of patches of a ground-truth image matte;
generating, utilizing the matte discriminator neural network, a plurality of discriminator classifications based on comparisons of the set of patches of the intermediate image matte to the additional set of patches of the ground-truth image matte;
generating a loss function comprising a sum of a plurality of separate loss functions corresponding to the coarse semantic mask, the detail mask, and the intermediate image matte; and
learning parameters of one or more branches of the generative neural network based on the plurality of discriminator classifications and the loss function.

8. The method of claim 1, further comprising:
determining indications of one or more erroneous regions of the intermediate image matte at one or more edges at a boundary between a foreground region and a background region based on the predicted absolute residual errors from the error map; and
generating, utilizing the refinement neural network, the final image matte by refining one or more patches of the intermediate image matte corresponding to the one or more erroneous regions.

9. The method of claim 8, wherein generating the final image matte comprises:
determining the one or more patches of the intermediate image matte based on error values in the error map;
refining, utilizing the refinement neural network, the one or more patches of the intermediate image matte without refining one or more additional patches of the intermediate image matte; and
generating the final image matte by upsampling the one or more patches refined utilizing the refinement neural network and the one or more additional patches of the intermediate image matte.

10. A system comprising:
a memory component; and
a processing device coupled to the memory component, the processing device to perform operations comprising:
extracting, utilizing a first neural network branch of a generative neural network, a coarse semantic mask and intermediate image features from a digital image;
extracting, utilizing a second neural network branch of the generative neural network, a detail mask from the coarse semantic mask and the intermediate image features generated by the first neural network branch and initial image features extracted from the digital image;
generating, utilizing a third neural network branch of the generative neural network; an intermediate image matte by fusing semantic features from the coarse semantic mask and detail features from the detail mask; and generating a final image matte by:
dividing the intermediate image matte into a plurality of patches, having a predetermined size and corresponding to different coordinates of the intermediate image matte;
determining a selected subset of patches of the plurality of patches based on error values corresponding to the plurality of patches from an error map comprising predicted absolute residual errors of pixels of the intermediate image matte; and
refining the selected subset of patches of the intermediate image matte utilizing a refinement neural network.

11. The system of claim 10, wherein extracting the coarse semantic mask comprises:
generating, utilizing a downsampling neural network layer, a downsampled image at a resolution lower than an original resolution of the digital image; and
extracting, utilizing the first neural network branch, the coarse semantic mask and the intermediate image features from the downsampled image.

12. The system of claim 10, wherein extracting the detail mask comprises:
determining multi-resolution image features based on the initial image features and the intermediate image features; and
extracting, utilizing the second neural network branch, the detail mask based on the multi-resolution image features and the coarse semantic mask.

13. The system of claim 10, wherein generating the intermediate image matte comprises:
determining, utilizing the third neural network branch, the semantic features of the coarse semantic mask;
determining, utilizing the third neural network branch, combined features based on the semantic features of the coarse semantic mask and the detail features of the detail mask from the second neural network branch; and
generating, utilizing the third neural network branch, the intermediate image matte based on the combined features.

14. The system of claim 10, wherein generating the final image matte comprises:
determining the selected subset of patches of the intermediate image matte in response to the selected subset of patches comprising predicted error values above an error threshold; and
combining the refined selected subset of patches of the intermediate image matte with one or more unrefined patches of the intermediate image matte.

15. The system of claim 10, wherein the operations further comprise:
generating, utilizing a semantic discriminator neural network, a discriminator classification based on a comparison of the coarse semantic mask to a ground-truth semantic mask; and
learning parameters of the first neural network branch based on the discriminator classification.

16. The system of claim 10, wherein the operations further comprise:
generating, utilizing a matte discriminator neural network, discriminator classifications based on comparisons of a set of patches of the intermediate image matte to patches of a ground-truth image matte; and
learning parameters of the first neural network branch, the second neural network branch, or the third neural network branch of the generative neural network based on the discriminator classifications.

17. A non-transitory computer readable medium comprising instructions, which when executed by a processing device, cause the processing device to perform operations comprising:
extracting, utilizing a generative neural network comprising a plurality of neural network branches, a coarse semantic mask and intermediate image features from a digital image;
extracting, utilizing the generative neural network, a detail mask based on the coarse semantic mask, the intermediate image features, and initial image features extracted from the digital image;
generating, utilizing the generative neural network; an intermediate image matte by fusing semantic features from the coarse semantic mask and detail features from the detail mask; and
generating a final image matte by:
dividing the intermediate image matte into a plurality of patches, having a predetermined size and corresponding to different coordinates of the intermediate image matte;
determining a selected subset of patches of the plurality of patches based on error values corresponding to the plurality of patches from an error map comprising predicted absolute residual errors of pixels of the intermediate image matte; and
refining the selected subset of patches of the intermediate image matte utilizing a refinement neural network.

18. The non-transitory computer readable medium of claim 17, wherein extracting the coarse semantic mask comprises:
generating, from the digital image, a downsampled image at a resolution lower than a resolution of the digital image; and
extracting, utilizing a semantic neural network branch of the generative neural network, the coarse semantic mask and the intermediate image features from the downsampled image.

19. The non-transitory computer readable medium of claim 18, wherein extracting the detail mask comprises:
extracting the initial image features from the downsampled image; and
extracting, utilizing a detail neural network branch of the generative neural network, the detail mask based on the coarse semantic mask and multi-resolution image features comprising the initial image features and the intermediate image features.

20. The non-transitory computer readable medium of claim 18, wherein generating the final image matte comprises:
generating scores for the plurality of patches of the intermediate image matte based on the error values from the error map; and
determining the selected subset of patches of in response to determining that scores of the selected subset of patches exceed an error threshold.

* * * * *